United States Patent [19]

Emmett

[11] Patent Number: 4,781,661

[45] Date of Patent: Nov. 1, 1988

[54] BOSS MOUNTED, NON-METALLIC PULLEY

[76] Inventor: John E. Emmett, 30159 Old Bedford, Farmington Hills, Mich. 48018

[21] Appl. No.: 63,661

[22] Filed: Jun. 19, 1987

[51] Int. Cl.[4] ............................................. F16H 55/48
[52] U.S. Cl. ................................... 474/190; 29/159 R
[58] Field of Search ............................. 474/190–192, 474/161; 29/159 R

[56] References Cited

U.S. PATENT DOCUMENTS

| 2,188,025 | 1/1890 | Weiss | 198/203 |
|---|---|---|---|
| 2,402,743 | 6/1946 | Firth | 29/159 R |
| 3,441,998 | 5/1969 | Furst et al. | 29/159 |
| 3,494,212 | 2/1970 | Thomson | 74/230.7 |
| 3,651,705 | 3/1972 | Bertinetti et al. | 474/161 |
| 3,696,685 | 10/1972 | Lampredi | 474/161 |
| 3,772,928 | 11/1973 | Gobeille | 29/159 R |
| 4,326,849 | 4/1982 | Van Zijderveld | 474/161 |

Primary Examiner—Thuy M. Bui
Attorney, Agent, or Firm—Basile and Hanlon

[57] ABSTRACT

A boss mounted, non-metallic pulley comprising a base member with a central aperture therein and an annular pulley track formed on an outer periphery of the base member which is axially offset with respect to and perpendicular to the hub, and a boss carrier formed on an inner surface of and integral with a base member, the boss carrier including a plurality of bosses, each with a mounting bore formed therein.

20 Claims, 2 Drawing Sheets

BOSS MOUNTED, NON-METALLIC PULLEY

BACKGROUND OF THE INVENTION

1. Field of the Invention

This invention concerns the field of non-metallic pulleys, and, specifically, the field of boss mounted, non-metallic pulleys particularly adapted for use in industrial applications, such as automotive, aviation, appliances and the like.

2. Description of the Prior Art

In recent years, the use of newer, non-metallic materials for various automotive components has become increasingly widespread. In order to remain competitive in the world market and in response to Federal mandates, automobile manufacturers have striven to achieve better and better fleet fuel economy ratings. One of the most obvious and most common ways to improve fleet miles per gallon ratings is by reducing weight. Generally, reducing the weight of an automobile necessitates replacing heavy metal components with those fabricated of lighter materials.

While metallic components suffer the disadvantage of being relatively heavy, the performance characteristics of metals are such that they are not always easy to duplicate with non-metallic materials. Particularly, it is difficult to duplicate the inherent strength properties of metal in non-metallic materials such as plastics without incorporating design modifications to the application. Furthermore, much care must be given to the particular type of plastic selected.

One non-metallic material, presently used for automotive pulley applications, is a type of thermoset phenolic molding compound. It is sold under the trade name "Durez" thermoset and is available from the Occidental Chemical Corporation. Phenolic molding compound, when used in pulley applications, enjoys a weight advantage over a typical metal, such as spun steel, of approximately 2:1. Its material characteristics with regard to wear resistance, heat resistance, dimensional stability, compressive strength and impact strength have been shown to be compatible with use in fabricating automotive pulleys.

One problem has arisen with the use of non-metallic automotive pulleys formed of phenolic molding compound. Heretofore, the use of this material has been limited to pulleys having a minimal mounting offset. The term mounting offset refers to the distance between the face of the pulley's mounting flange or hub and the center of the pulley belt. The longer the distance between the mounting flange and the center of the belt, the greater is the mounting offset and the greater the stress placed on the pulley belt due to the effect of the cantilevered load.

A problem arises because certain prior art automotive engine pulleys, such as those used on the crankshaft, typically require a relatively large mounting offset. That is, these pulleys must be mounted such that there is a large distance between the center of the pulley belt and the location of the mounting surface.

What is needed is a non-metallic pulley which may be used for applications which require a substantial mounting offset in the hub mounted pulley, but which will still exhibit enough strength to support the heavy, cantilever load applied by the pulley belt.

SUMMARY OF THE INVENTION

The herein invention provides a means to support the cantilevered load supplied by offset operating conditions which will permit the use of a non-metallic material, such as phenolic molding compound, to form the pulley. According to the herein invention, the method of mounting the pulley has been redesigned and the mounting bolts have been moved nearer to the belt center. This is achieved by providing molded bosses which receive longer mounting bolts. Additionally, metal sleeves are provided within the molded bosses to help take the compressive load of the bolt torque. There metal sleeves may be pressed in after molding or molded in as inserts during the molding process.

What is disclosed and claimed herein is a boss mounted, non-metallic pulley which comprises a base member having a hub with a centrally disposed aperture formed therein and an annular side wall formed on the periphery of the hub and projecting axially therefrom. An annular pulley track is formed an outer periphery of the side wall and is axially offset with respect to and perpendicular to the hub. A boss carrier is formed on an inner surface of the base member and is integral with both the hub and the side wall. The boss carrier includes a plurality of radially extending bosses. A mounting bore is formed in each boss which extends therethrough and continues through the hub of the base member. Preferably, the base member, pulley track and boss carrier are formed integrally with each other out of a thermoset plastic such as, for example, a phenolic molding compound or any other suitable material.

The annular pulley track may be formed directly on an outer surface of the side wall. However, to increase the length of the pulley track, the pulley track may be formed to comprise a stem extending radially from the sidewall of the base member and a grooved portion extending perpendicularly from the stem. The grooved portion is axially offset with respect to and perpendicular to the hub.

The bosses may be formed directly on the inner or the outer surface of the cylindrical member. However, in an alternative embodiment, the boss carrier includes a rim of substantially uniform radial width which extends radially from the sidewall for substantially the entire width thereof. If the rim is formed on the outer surface of the sidewall, the plurality of bosses will extend radially from the rim and in a radial direction toward the pulley track. Alternatively, if the rim is formed on the inner surface of the sidewall, the plurality of bosses will extend radially therefrom in a radial direction toward the central aperture of the base member.

The boss mounted, non-metallic pulley of the instant invention may further comprise a metal sleeves disposed in each mounting boss. Mounting bolts may be supplied to the pulley as part of the metal sleeve to assist in assembly of the pulley to the device on which it is to be mounted.

BRIEF DESCRIPTION OF THE DRAWING

The various features, advantages and other uses of the present invention will become more apparent by referring to the following detailed description and drawing in which.

DETAILED DESCRIPTION OF THE PREFERRED EMBODIMENTS

Figure 1:
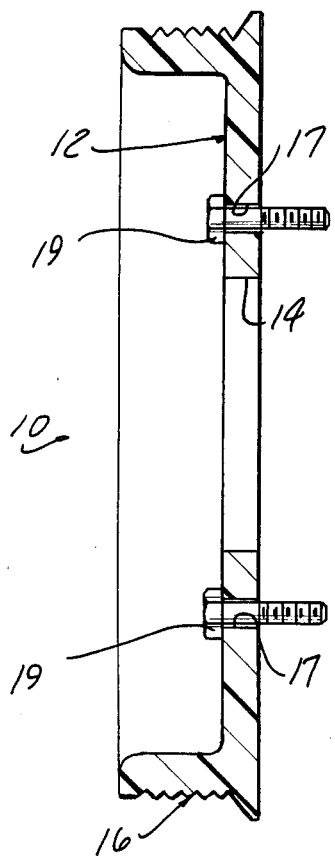
FIG. 1 is a cross sectional view of a conventional, minimal offset pulley.

Throughout the following description and drawing, identical reference numbers are used to refer to the same components shown in multiple figures of the drawing.

FIG. 1 depicts a conventional, hub mounted non-metallic pulley 10 shown in cross section. The conventional pulley 10 has a bell shaped hub 12 with a central aperture 14 therein. A pulley track 16 is disposed annularly around the periphery of bell shaped hub 12. Formed in bell shaped hull 12 are mounting bores 17. Mounting bolts 19 are inserted into mounting bores 17 in order to mount the pulley to the device with which it is to be used.

As can be seen clearly in FIG. 1, conventional pulley 10 has very little mounting offset. The distance between the mounting bolts 19 and the pulley track 16 is small. Hence, the compressive and tortional forces exerted on pulley 10 at its point of attachment are relatively small.

With reference to FIGS. 2-5, there are depicted alternate embodiments of a boss mounted, non-metallic pulley 20 designed in accordance with the teachings of the instant invention. The pulley 20 comprises a base member 22 which is formed by a hub 24 and an annular side wall 26 formed on the periphery of hub 24 which extends axially therefrom. An aperture 25 is formed in the center of hub 24 and may be used for centering the pulley 20 when mounting it to another device (not shown). An annular pulley track 28 is formed on an outer periphery of the side wall 26 and is axially offset with respect to and perpendicular to hub 24.

In order to avoid a large mounting offset, boss carrier 30 is formed on an inner surface of base member 22 and is integral with both hub 24 and side wall 26. This can best be seen in FIG. 4, wherein boss carrier 30 comprises a rim 31 of substantially uniform radial width which extends radially from side wall 26. Preferably, rim 31 extends radially from side wall 26 for substantially the entire width thereof. Formed on rim 31 is a plurality of bosses 32. In the embodiments in FIGS. 2-5, each of the plurality of bosses 32 comprise a hemispherical bulge which extends radially from the rim 31.

Figure 3:
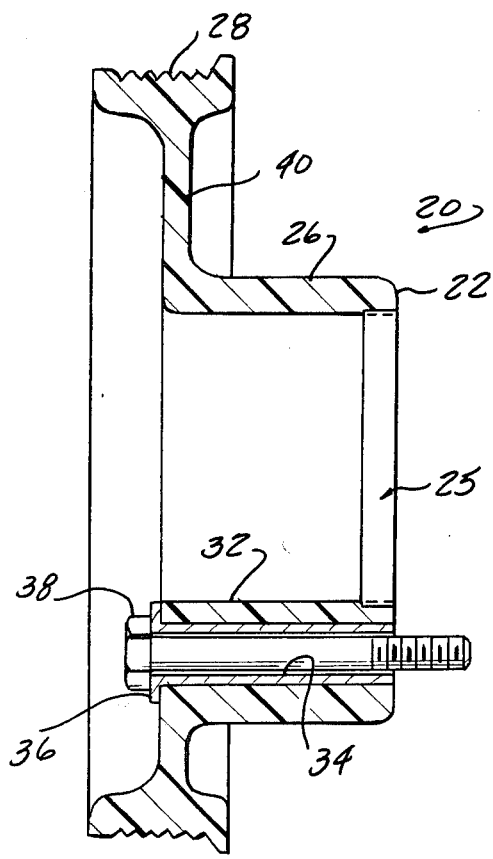
FIG. 3 is a partial cross sectional view of the embodiment of the pulley shown in FIG. 2.

Formed centrally in each boss 32 is a mounting aperture 34. Preferably, a metal sleeve 36 is disposed inside of each mounting aperture 34 to provide additional strength. Each of mounting bores 34 extends entirely through the boss 32 in which it is disposed and also through hub 24. As can be seen in FIG. 3, mounting bolts 38 may be detachably mounted in each metal sleeve 36.

Figure 2:
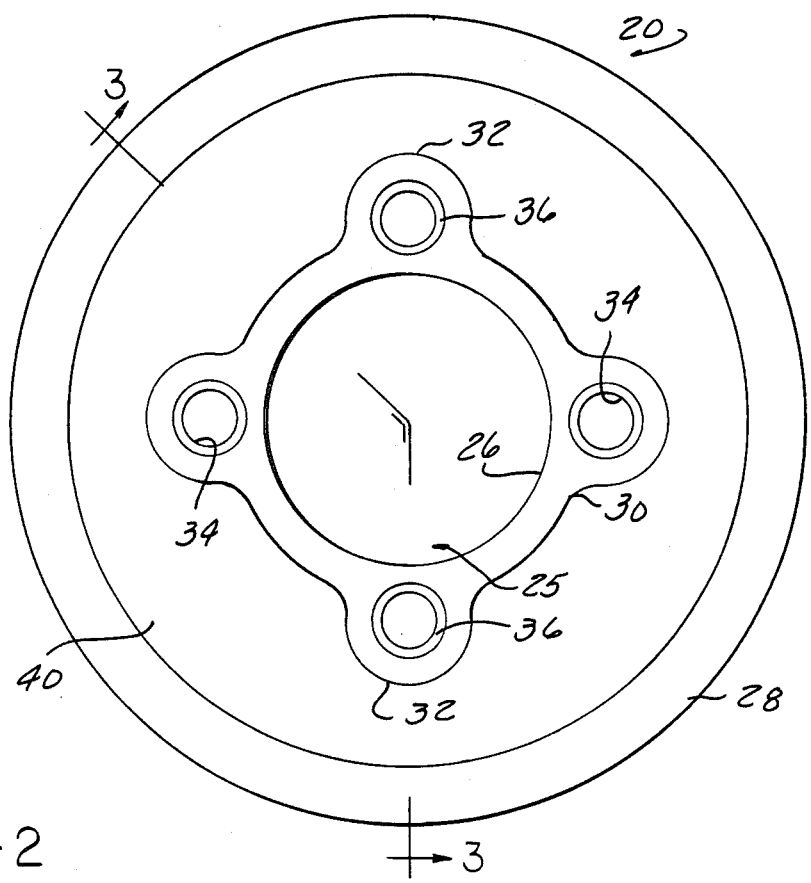
FIG. 2 is a front view of a boss mounted pulley fabricated in accordance with the teachings of the present invention.
Figure 4:
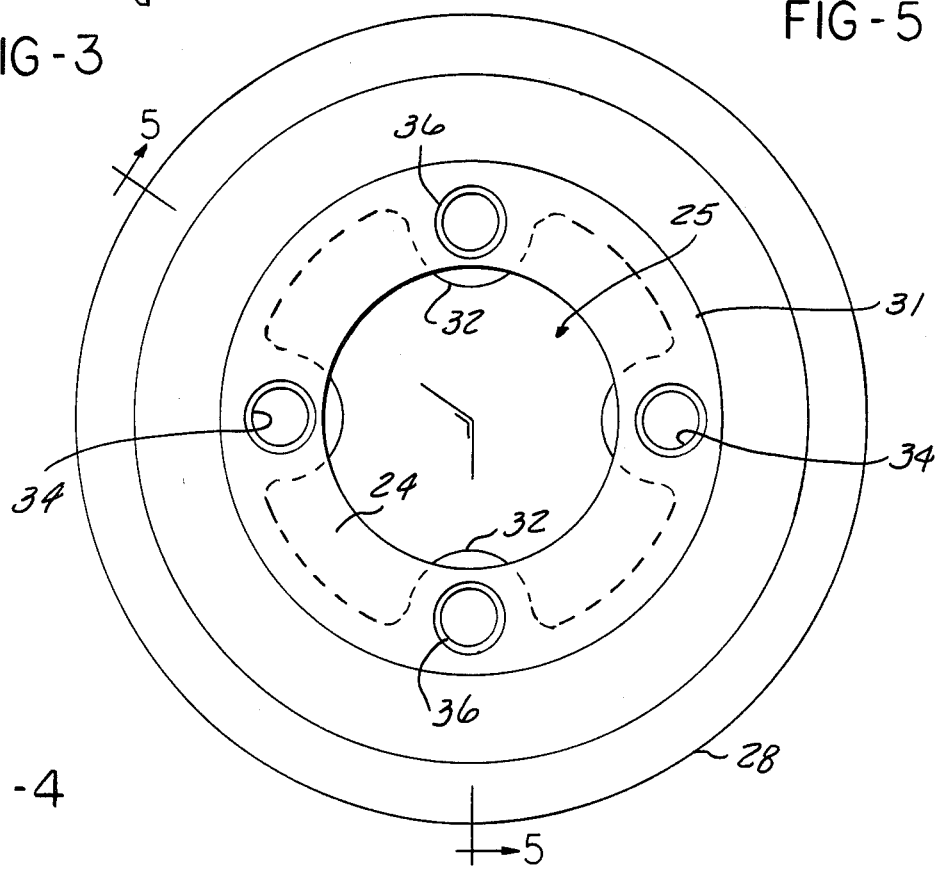
FIG. 4 is a front view of an alternative embodiment of the boss mounted pulley of the present invention.

In the embodiment depicted in FIGS. 2 and 4, a boss carrier 30 is formed on the outer surface of side wall 26 and extends in a radial direction toward a pulley track 28. Hence, bosses 32 also extend in a radial direction outward.

Figure 5:
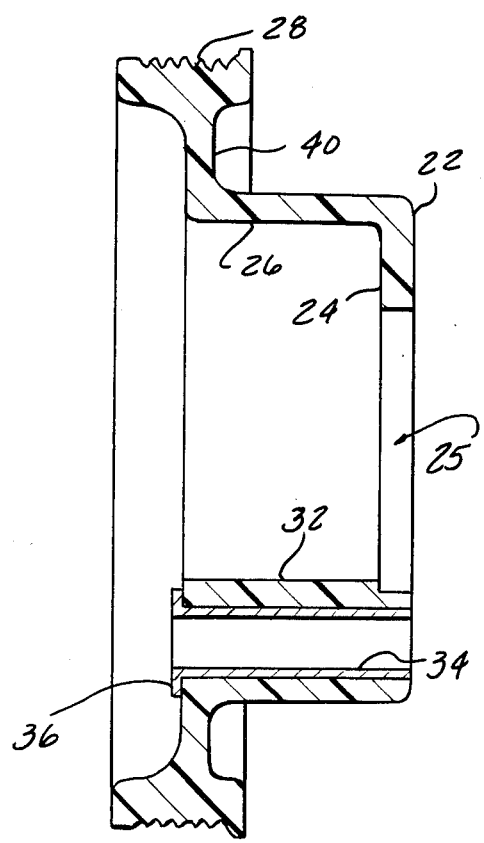
FIG. 5 is a partial cross sectional view of the embodiment of the present invention shown in FIG. 4.

In the embodiment depicted in FIGS. 3 and 5, boss carrier 30 is formed on the inner surface of side wall 26 and extends in a radial direction toward a central aperture 25. Hence, the plurality of bosses 32 also extend radially inward.

In order to provide a larger pulley track 28 in relation to the diameter of base member 22, the pulley track 28 may further comprise a stem portion 40 which is formed on the outer periphery of side wall 26 and extends radially outward therefrom. An annular grooved portion 42 extends perpendicularly from the stem 40.

As may be seen in FIG. 3, while there is an advantageously large distance between pulley track 28 and hub 24 of boss mounted pulley 20, there is virtually no offset between the head of the mounting bolt 38 and the pulley track 28. Thus, when the pulley is mounted to the device and is in use, the cantilever effect which would be present if the head of mounting bolt 38 were immediately adjacent hub 24 is virtually eliminated. Since no undue strain will be placed on boss mounted pulley 20 it, like conventional, hub-mounted pulley 10 with its relative small mounting offset, may be formed of a non-metallic material such as a phenolic molding compound of the type described.

Other configurations and arrangements of the elements disclosed therein may occur to one skilled in the art without departing from the spirit of the concept disclosed herein. For example, the bosses do not necessarily have to have a hemispherical shape but may be of any suitable shape. The bosses may be formed directly on the side wall and the necessity of a rim eliminated. The bosses may be of a different width than the side wall. Also, although the figures depict the base member comprised of a flat hub and a perpendicularly extending annular side wall, the shape of the base member may be other than that depicted, as for example, a bell shape. Furthermore, the necessity of the stem portion of the pulley track may be eliminated and the pulley track may be formed directly to the surface of the side wall. Additionally, while the plurality of bosses are depicted as all projecting exclusively radially inward or exclusively radially outward, it is contemplated that the boss mounted, non-metallic pulley of the instant invention may be designed so that some of the plurality of bosses extend radially inward while others extend radially outward. While the invention has been disclosed with reference to certain embodiments and exemplifications thereof, it is not intended to be limited so but solely by the claims appended hereto.

I claim:

1. A boss mounted, non-metallic pulley comprising:
    a base member having a radially extending hub and an axially projecting sidewall formed on a surface of the hub;
    an annular pulley track, formed on an outer periphery of the base member, axially off-set with respect to and perpendicular to the hub; and
    a boss carrier formed on a surface of the base member and integral therewith, said boss carrier including a plurality of radially extending bosses and a mounting bore formed in each boss extending axially from the annular pulley track through the base member.

2. The pulley of claim 1 wherein the base member, the pulley track, and the boss carrier are integral with each other.

3. The pulley of claim 1 further comprising a metal sleeve disposed in each mounting bore.

4. The pulley of claim 3 further comprising mounting bolts detachably mounted in each metal sleeve.

5. The pulley of claim 1 wherein the boss carrier is formed on an inner surface of the sidewall and the bosses extend radially toward the central aperture.

6. The pulley of claim 1 wherein the boss carrier is formed on an outer surface of the sidewall and the bosses extend radially toward the pulley track.

7. A boss mounted, non-metallic pulley comprising:
a cylindrical member having a hub with a centrally disposed aperture formed therein and an annular sidewall formed on the periphery of the hub and projecting axially therefrom;
an annular pulley track formed on an outer periphery of the sidewall including a stem portion extending radially from the sidewall and a grooved portion extending perpendicularly from the stem portion, said grooved portion being axially off-set with respect to and perpendicular to the hub; and
a boss carrier formed on an inner surface of the cylindrical member and integral with both the hub and the sidewall, said boss carrier including a rim of substantially uniform radial width extending radially from the sidewall for substantially the entire width thereof, a plurality of bosses formed on the rim and extending radially therefrom, and a mounting bore formed in each boss extending therethrough and continuing through the cylindrical member.

8. The pulley of claim 7 wherein the cylindrical member, the pulley track, and the boss carrier are integral with each other.

9. The pulley of claim 7 further comprising a metal sleeve disposed in each mounting boss.

10. The pulley of claim 9 further comprising mounting bolts detachably mounted in each metal sleeve.

11. The pulley of claim 7 wherein the boss carrier is formed on an inner surface of the sidewall and the bosses extend radially toward the central aperture.

12. The pulley of claim 7 wherein the boss carrier is formed on an outer surface of the sidewall and the bosses extend radially toward the pulley track.

13. The pulley of claim 7 wherein each of the plurality of bosses comprises a hemispherical bulge extending radially from the rim.

14. The pulley of claim 7 wherein the pulley is formed of a phenolic molding compound.

15. A boss mounted, non-metallic pulley comprising:
a base member having a radially extending hub and an axially projecting sidewall formed on a surface of the hub;
an annular pulley track axially off-set with respect to and perpendicular to the hub, said annular pulley track supported by said sidewall; and
a boss carrier formed on a surface of the base member and integral with both the hub and the sidewall, said boss carrier including a plurality of radially extending bosses and a mounting bore formed in each boss extending axially from the annular pulley track through the base member.

16. The pulley of claim 15, wherein the boss carrier is formed on an inner surface of the sidewall and the bosses extend radially inward.

17. The pulley of claim 15, wherein the boss carrier is formed on an outer surface of the sidewall and the bosses extend radially outward.

18. The pulley of claim 15, wherein the base member, the pulley track, and the boss carrier are integral with each other.

19. The pulley of claim 15, further comprising a metal sleeve disposed in each mounting bore.

20. The pulley of claim 19, further comprising mounting bolts detachably mounted in each metal sleeve.

* * * * *